United States Patent [19]
Thorburn et al.

[11] Patent Number: 5,783,752
[45] Date of Patent: Jul. 21, 1998

[54] DIFFUSE SURFACE INTERFERENCE POSITION SENSOR

[75] Inventors: William G. Thorburn, Whitinsville; Donald K. Mitchell, Newton; Bruce A. Horwitz, Centre, all of Mass.

[73] Assignee: MicroE, Needham Heights, Mass.

[21] Appl. No.: 803,420

[22] Filed: Feb. 20, 1997

[51] Int. Cl.$^6$ .................................................. G01B 11/16
[52] U.S. Cl. .................................. 73/800; 73/655; 356/356
[58] Field of Search ..................... 73/800, 655; 356/356, 356/358

[56] References Cited

U.S. PATENT DOCUMENTS

| | | | |
|---|---|---|---|
| 3,870,414 | 3/1975 | Duffy | 73/655 |
| 4,113,388 | 9/1978 | Gates et al. | 356/110 |
| 4,210,399 | 7/1980 | Jain | 356/28.5 |
| 4,591,996 | 5/1986 | Vachon | 73/800 |
| 4,872,751 | 10/1989 | Hercher | 356/35.5 |
| 4,966,459 | 10/1990 | Monchalin | 73/657 |
| 5,098,190 | 3/1992 | Wijntjes et al. | 356/356 |
| 5,317,385 | 5/1994 | Silva et al. | 356/356 |
| 5,394,752 | 3/1995 | Reda | 73/800 |
| 5,426,498 | 6/1995 | Brueck et al. | 73/800 |

OTHER PUBLICATIONS

*1995 Photonics Circle of Excellence Award Winners,* MicroE Inc., "Optical Push Pin/Precision Positioner," reprinted from Photonics Spectra, May 1995, 1 page.

Yamaguchi, Ichirou et al., "Laser speckle rotary encoder," *Applied Optics,* vol. 29, No. 20, Oct. 15, 1989, pp. 4401–4406.

Yamaguchi, Ichirou et al., "Linear and rotary encoders using electronic speckle correlation," *Optical Engineering,* vol. 30, No. 12, Dec. 1991, pp. 1862–1868.

Hercher, Michael et al., "Interferometric measurement of in-plane motion," Optical Testing and Metrology III: Recent Advances in Industrial Optical Inspection; Proceedings of the Meeting, San Diego, CA, Jul. 8–13, 1990, Society of Photo-Optical Instrumentation Engineers, vol. 1332, 1990, pp. 602–612.

*Primary Examiner*—Max H. Noori
*Attorney, Agent, or Firm*—Hamilton, Brook, Smith & Reynolds, P.C.

[57] ABSTRACT

Position of a diffusely scattering surface is detected by interfering backscattered light from respective input beams which illuminate a common spot. Through polarization of the input beams and appropriate filtering, backscattered light is isolated from specularly reflected light and interfered to form a fringe pattern on a detector. The position sensor has particular applicability as a push pin sensor in a hard disk servo system.

20 Claims, 9 Drawing Sheets

DIFFUSE SURFACE INTERFERENCE POSITION SENSOR

BACKGROUND

The present invention relates to the detection of lateral position of a surface by measuring relative displacement of that surface.

In the field of optical encoders, very fine resolution of relative displacement can be obtained through interferometry. A precision diffraction grating on the surface is illuminated with one or two beams from a common laser source. Reflected or transmitted diffracted light interferes to create a fringe pattern, the position of which corresponds to the position of the surface. If the fringe pattern is detected as respective sine and cosine signals, direction of movement of the surface can also be detected. Such a system is presented in U.S. Pat. 5,486,923 to Mitchell and Thorburn.

prior interferometric position sensors have required that the grating be positioned on the moving surface. To thus affect the measured surface may be undesirable. Further, the grating must be aligned with the sensor system with great precision, a requirement which greatly complicates assembly.

Attempts have been made to use laser techniques to detect lateral displacement of a diffuse surface without the requirement for a diffraction grating. For example, encoders based on the correlation of speckle patterns have been suggested by Yamaguchi et al., "Linear and Rotary Encoders Using Electronic Speckle Correlation," Optical Engineering, Dec. 1991, Volume 30, Number 12. An interferometric approach has been suggested by Hercher et al. in "Interferometric Measurement of In-plane Motion," Optical Testing and Metrology III: Recent Advances in Industrial Optical Inspection, proceedings of the Meeting, San Diego, Calif. Jul. 8–13, 1990; Bellingham, Wash. Society of photo-Optical Instrumentation Engineers, 1990, pp. 602–612. Both systems rely on the generally random phase shifts of coherent radiation scattered from a diffuse surface.

SUMMARY OF THE INVENTION

The prior speckle pattern diffuse surface encoder has lacked the resolution that is often required. The prior diffuse surface interferometric approach, on the other hand, is sensitive to nonlateral motion and position such as roll and standoff distance along an axis normal to the surface.

In accordance with the present invention, a position sensor comprises a source of coherent illumination which illuminates a diffusely scattering surface, the motion of which is to be measured, with first and second input beams. The input beams are angled toward the surface forwardly and rearwardly relative to surface motion. Optics direct light, scattered from the surface in forward and rearward directions relative to surface motion, to a fringe detector to form a fringe pattern in the plane of the detector. Movement of the surface is detected by the fringe detector through movement of the fringe pattern.

Illumination of the diffusely scattering surface by separate input beams from forward and rearward directions, and, in the reflective case, the detection of backscattered light from each beam, minimizes sensitivity to movement of the surface in a direction normal to the surface. Backscattered light is that which, when projected onto the plane of incidence of an input beam, is substantially colinear with the input beam. Most preferably, the backscattered light is in the same plane as and is colinear with the input beam.

In order to minimize sensitivity to roll, it is preferred that the input beams illuminate a common spot of the diffusely scattering surface.

Preferably, in order to detect only the desired backscattered light, and not specularly reflected or scattered light from the incorrect beam, the input beams are differentiated by polarization. In one embodiment, a beam of coherent illumination is split into the separate input beams by a polarizing beam splitter, and backscattered light to the detector is filtered by a polarizing beam splitter. In another embodiment, separate input beams of coherent illumination of common polarization are directed toward the surface through a polarizing beam splitter. Light from the separate input beams is separated by polarization wave plates, and the resultant backscattered beams are applied to the fringe detector.

The preferred embodiments of the invention rely on a quasi-monochromatic laser source and are able to detect position of a stationary surface. To that end, a preferred fringe detector is an array of light sensors such as the phased array detector described by Mitchell and Thorburn.

A preferred application of the invention is that of a "push pin" sensor in a servo track writer for hard disk drive fabrication. In that application, the diffusely scattering surface is on the read/write arm of a hard disk memory system. In the past, servo tracks have been written onto the memory disks through the use of a push pin which mechanically displaces the read/write arm of the memory system. More recently, a diffraction grating has been placed on the read/write arm to permit accurate sensing of the position of the arm, which is then controlled through its own voice coil motor in a servo control loop. In accordance with the present invention, the diffusely scattering surface of the read/write arm is monitored using the optical system described above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

In preferred embodiments of the invention, light from a laser is focused and split into input beams which are directed to the diffuse surface. Scattered light is accepted back into the sensor and directed to a detector array where an interference pattern is formed. As the diffuse surface is translated, the scattered light is shifted in phase, causing the interference fringes to translate over the detector. The resulting detector signals change in direct proportion to the lateral movement of the surface. Although described below principally in terms of an opaque surface, the invention may also be applied to a transmissive surface.

Figure 1:
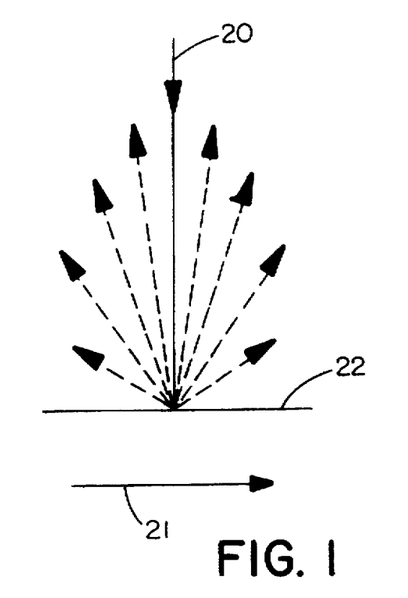
FIG. 1 illustrates randomly phased scattered rays from a diffuse surface.

To understand the basic operating principles of a diffuse sensor, begin by looking at a single coherent laser beam 20 directed down to a surface 22 at normal incidence as illustrated in FIG. 1. As a region of the surface is illuminated, light is scattered in virtually all directions from each point within that region. The phase of the scattered light in any particular direction from any particular point could be anything between 0 and $2\pi$, this random phase being due to the random surface roughness.

Each location in space above the surface is a meeting point for an infinite number of randomly phased rays that originate from each illuminated point on the surface. Due to the coherent nature of the light, distinct speckle patterns are formed; that is, there will be constructive interference of this energy at some locations, and destructive interference at others, depending on the random set of phases dealt to each point in space. The speckle pattern comprises bright and dark randomly arranged patches when viewed on a screen.

The graininess of the speckle pattern (i.e., the sizes of the bright and dark patches) is dependent on the size of the illuminated spot and the distance between the diffuse surface and the viewing plane. As the illuminated spot gets smaller, the speckles grow larger; viewing the speckles farther away has the same effect. By selectively restricting the light to a relatively small cone of illumination, by the use of apertures or by illuminating only a small spot on the surface, for example, there are less contributors to the energy at each spot and the speckles are larger.

Consider the scattered light from a single small spot on the diffuse surface, a spot that comes from a narrow, normally incident beam as in FIG. 1. Light heads off in all directions from that spot, and the amount of energy in any particular direction is a function of the off-axis angle. As the surface moves, the phase of the scattered light is affected, and the magnitude of this phase change is also a function of the off-axis angle. As the surface moves to the right as indicated by arrow 21, the light that is scattered to the right is upshifted, or advanced in phase, and the greater the off-axis angle of the light, the greater the upshift. Light scattered to the left will be phase-shifted in an equal but opposite manner as a function of angle; i.e., that light will be downshifted as the surface moves to the right.

When the illuminated spot is larger, so that many scattering points must be considered, all scattered rays directed to a single point in the detection plane are phase shifted in unison, so that for small movements the speckle does not change much. It is the relative phase between all of the contributors that determines the speckle pattern, not some absolute phase. However, as the surface continues to move, it becomes clear that the speckle pattern is actually gradually changing, since moving the surface changes the set of scattering points that determines that speckle pattern.

It is important to note that increasing the speckle size by making the spot small on the surface has the advantage of creating speckles spatially large enough to cover a detector, but the disadvantage of causing the speckle to move relatively fast across the detector plane for a given surface movement, since it takes very little movement to completely change the set of scattering points that contributes to the speckle.

Figure 2:
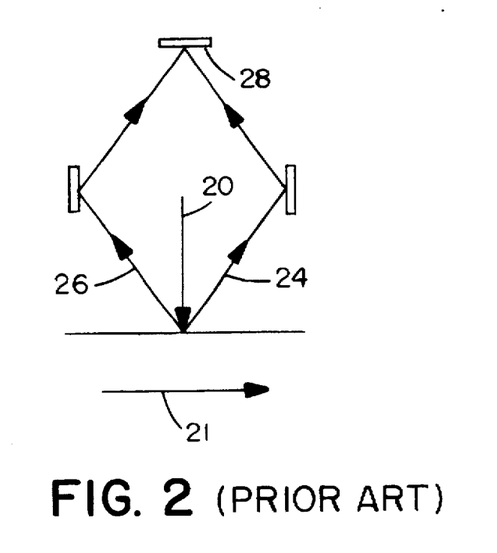
FIG. 2 illustrates a prior art interferometer.
Figure 3:
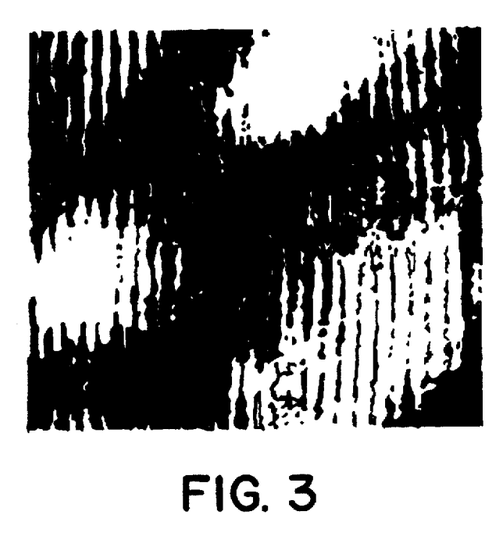
FIG. 3 illustrates the speckle and fringe pattern obtained from a 2-beam diffuse interference.

If, as illustrated in FIG. 2, we direct a narrow right-scattered cone of light 24 to a detector plane 28, and also direct a left-scattered cone of light 26 to the same detector, the overlapping of this illumination creates a more complex interference pattern on the detector array. The result is different from a simple addition of the individual speckle patterns. Since these two "beams" can interfere with each other, and they come together at two different average incident angles, relatively straight interference fringes are formed within a new speckle pattern as illustrated in FIG. 3. The fringe period is determined by the wavelength of the light and the angle between the two beams; the greater the angle, the smaller the period.

Using this optical system that combines right-scattered light with left-scattered light, translate the diffuse surface. The speckle pattern will change slowly as the surface is moved and the set of scattering points is altered. In addition, since one of the beams is upshifted and the other is downshifted, the relative phase between the two beams changes in direct proportion to the surface motion; this relative phase change results in fringe motion. Fringes are seen moving within the speckle, as the speckle is changing its shape at another rate, a slower rate with proper selection of spot size. This means that the output from the detector will consist of high modulation signals over a finite range, and then drop off in modulation as the speckle changes to a dark speckle in the detector region. Further movement of the surface will illuminate the detector with another bright speckle and high contrast fringes resulting in another set of high modulation signals.

The sensitivity to motion is determined by the angles between the scattered rays and the specular reflection direction. Until now we have suggested that only the angle between the scattered ray and the normal determines the sensitivity; but in our examples so far we have been considering only the case of a normal incident beam, and there the specular reflection is along the normal. The greater the angle between the specular reflection and the scattered ray, the smaller the surface motion required to generate a $2\pi$ relative phase change between the beams at the detector. The $2\pi$ phase change causes the fringes to move through one cycle.

Figure 4:
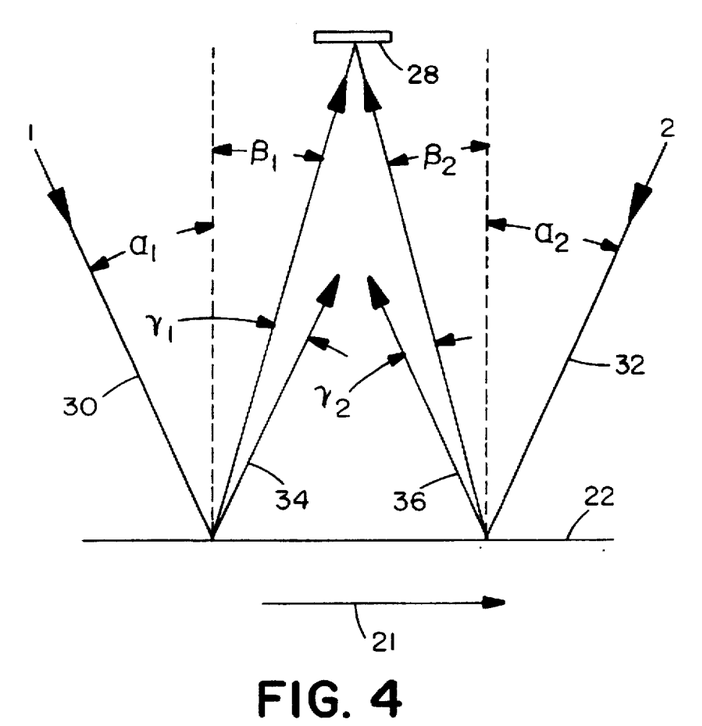
FIG. 4 illustrates aspects of the invention.

If, as illustrated in FIG. 4, we use two input beams 30,32 from the same source and allow the scattered light 34,36 to interfere on the detector 28, the sensitivity (i.e., the surface motion to produce one cycle of fringe motion), is determined by Sensitivity=$(\sin(\gamma_1) - \sin(\gamma_2))/\lambda$ Where $\lambda$=wavelength, $\gamma_{1,2}$=angle between specular reflection and scattered ray for beams 1 (30) and 2 (32), respectively, where the signs of the angles are positive if the scattered ray is rotated from the specular ray toward the vector which describes the surface motion and negative if the rotation of the ray from the specular ray is away from the direction of the surface motion. Thus, in FIG. 4, $\gamma_1$ is negative and $\gamma_2$ is positive.

We also define $\alpha_{1,2}$=angle between the input ray and the normal for beams 1 and 2, respectively, $\beta_{1,2}$=angle between the scattered ray and the normal for beams 1 and 2, respectively.

The specific design for the sensor can be engineered to maximize alignment tolerances and minimize the sensitivity to motions along axes orthogonal to the measurement axis. For our discussion, we define our coordinate system as follows:

X-axis: The direction in which motion is to be measured.

Y-axis: The axis perpendicular to the x-axis in the plane of the surface.

Z-axis: The axis which is perpendicular to the surface.

Roll: Rotation about the Y-axis.

A laser/lens assembly, not shown, generates a converging beam that is split and redirected to form two input beams 30,32 that lie in the x/z plane. Z-axis sensitivity is minimized by sampling the backscattered light that returns along each of these two paths 30,32 taken by the incident beams, that is, where $\alpha_{1,2}=\beta_{1,2}$, respectively. If the diffuse surface is moved away from the sensor, the distance between the detector 28 and the illuminated spots on the surface is increased, which normally would reduce the angle between the two interfering scattered beams and result in a larger fringe period. But with $\alpha_{1,2}=\beta_{1,2}$, moving the diffuse surface also changes the separation of the two spots, compensating for the increased detector-to-surface standoff and maintaining a constant angle between the scattered beams at the detector. The result is a near constant period which minimizes any contrast loss due to mismatches with the fringe detector. In addition, maintaining symmetry, that is having $\alpha_1=-\alpha_2$, eliminates a phase shift error which occurs with z-axis motion when the two input beams reach the surface asymmetrically.

Even in the case when $\alpha_{1,2} \neq \beta_{1,2}$ the resulting z-axis sensitivity can be minimized. The sensitivity to z-axis motion depends on the symmetry of the input beams about the normal to the surface, the magnitudes of $\gamma_{1,2}$ and the magnitudes of $\alpha_{1,2}$. For example, with a 70 mm detector standoff $|\alpha_{1,2}|=2.75$ degrees and $|\alpha_{1,2}|=0.5$ degrees, there is only a minor 1.0% change in the interference fringe period form a 1.0 mm z-axis displacement. On the other hand, with $|\alpha_{1,2}|=1$ degree and $|\gamma_{1,2}|=3$ degrees the interference fringe period will change by 5.5% for the same displacement.

Roll sensitivity is minimized by ensuring that the two input beams are focused onto the same point on the diffuse surface. As the surface is tilted, the beams may see a phase advance or retardation, but the two beams will change identically. This would not be the case if the spots were separated on the surface. Remember that it is relative phase change between the two beams that results in fringe movement. Overlapping the illuminated spots not only minimizes the roll sensitivity, but also maximizes the roll range over which the sensor can operate. Of course, if the surface is moved away from the sensor in the z-direction, the spots will separate slightly on the surface and there will be some residual roll sensitivity; but that change will be minor given the typical, limited z-axis range (e.g., ±0.5 mm), and a small angle of incidence.

The range of y-axis motion is maximized by keeping the speckle change as a function of diffuse surface position small in that dimension. The key is to make the speckle large enough to adequately cover the detector with uniform, straight fringes, but also keep the illuminated spot large enough so that many scattering points are contributing to that speckle, resulting in a relatively low rate of speckle change.

The sampling of backscattered light must be done in such a way that the specular reflection from the opposite input beam does not travel along that same path as the desired backscattered light and find its way to the detector. If it did, the result would be a large amplitude subharmonic in the fringe pattern. To protect against this, polarization filtering is employed in the preferred embodiments.

Figure 5A:
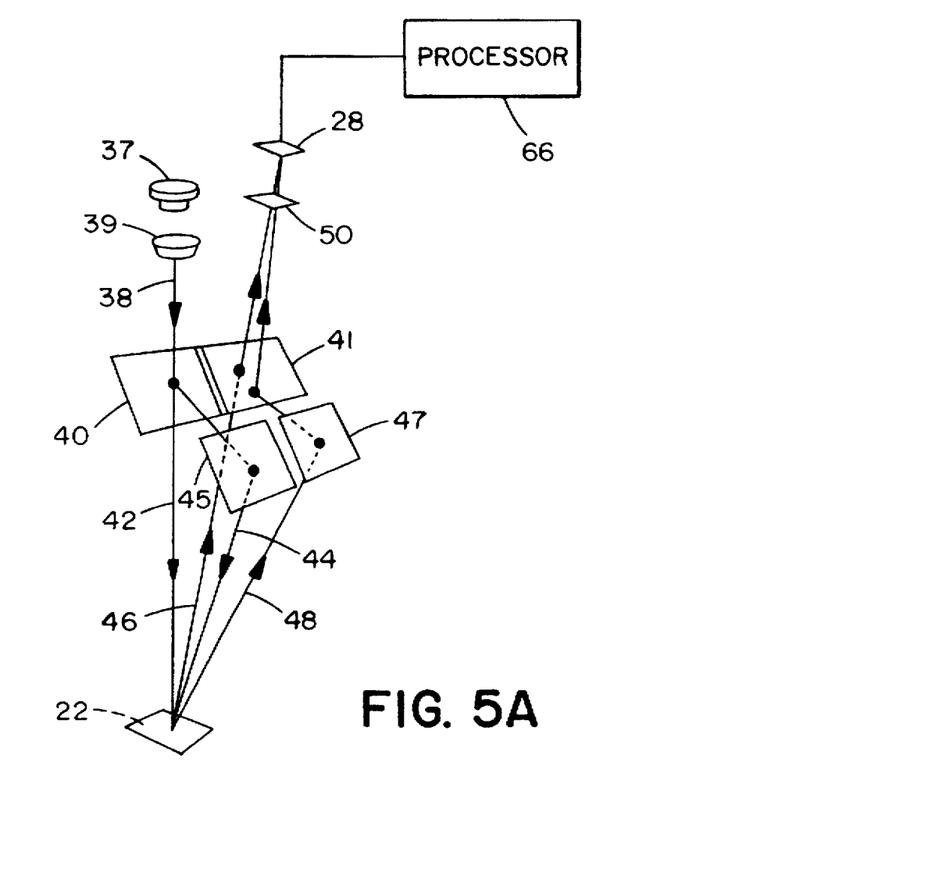
FIGS. 5A and 5B illustrate a preferred embodiment of the invention.
Figure 5B:
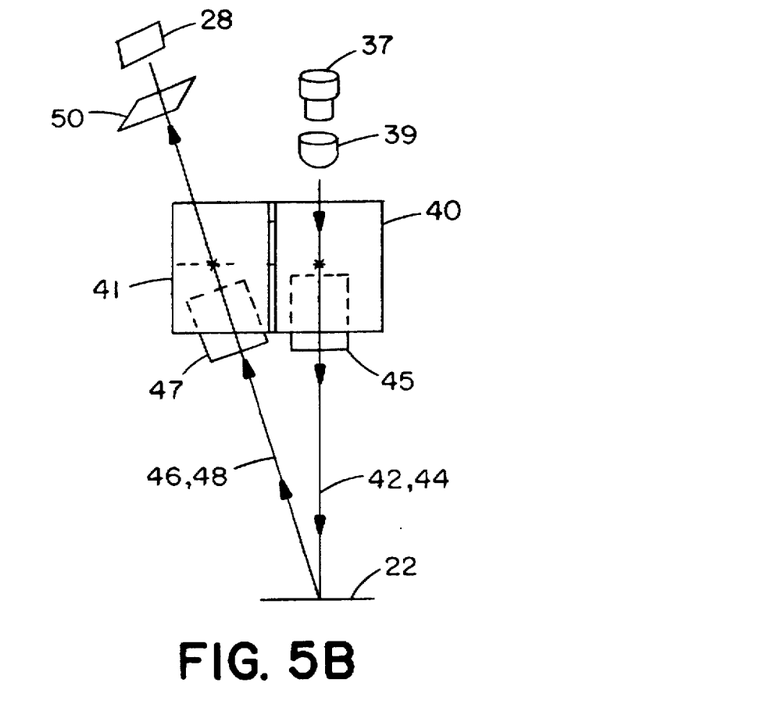

In one approach illustrated in FIGS. 5A and 5B, a linearly polarized converging input beam 38 is split by a polarizing beamsplitter 40, creating two orthogonally polarized input beams 42,44 which are directed to the diffuse surface 22 in the x/z plane, the latter beam by mirror 45. The scattered light is sampled off axis, as illustrated in FIG. 5B, and the two return paths 46,48, one of which includes mirror 47, are polarization filtered by the beam splitter 41. The polarization filtering effectively blocks light of the unwanted linear polarization, such as the specular reflection from the other input beam. To cause the two beams to interfere at the detector, a polarizer 50 can be inserted in the two rays, or retarders can be used, one in each path just before the detector, to convert the two beams to a common polarization. In spite of the off-axis return path, the sampled light is effectively backscattered colinearly with the input beams since projections of the scattered rays onto the input plane fall directly on top of the input rays. Alternatively, the input beams could be off-axis with the detection beams on-axis, or both could be off-axis.

Figure 8:
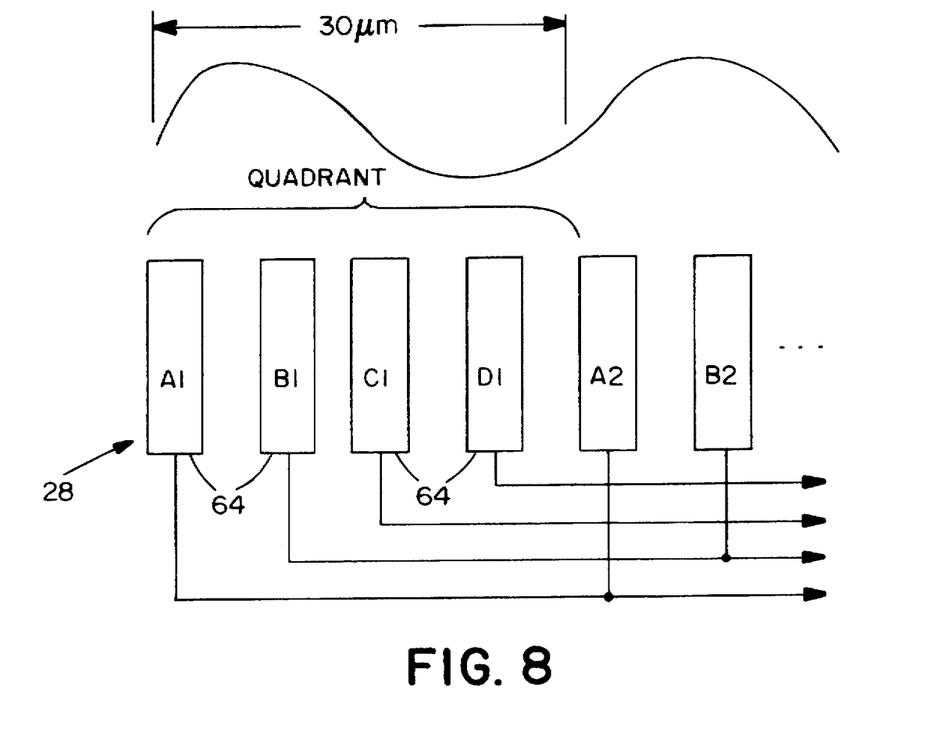
FIG. 8 illustrates a preferred phased array fringe detector for use with the invention.

The preferred fringe detector 28 is a phased array detector such as disclosed in U.S. Pat. No. 5,486,923. Such a detector is illustrated in FIG. 8. The example phased array is a linear array of detector elements 64 grouped as quadrants of elements A, B, C and D. All elements of the same letter designation are tied together to provide a summed output, thus providing four summed outputs. The phased array is designed to match the period of the fringe which is to be detected, the quasi-sinusoidal fringe amplitude being illustrated above the detector array in FIG. 8. Thus, in one system the optics are designed to provide a fringe at the detector 28 having a period of 30 microns to match a quadrant length of 30 microns. Thus, the signals detected within each quadrant are reinforced by signals received in successive quadrants at successive fringes. The four outputs from the detector array are processed by the processor electronics 66 to generate sine and cosine outputs which in turn provide high resolution position and direction of movement signals.

Other detectors such as CCD arrays may also be used. In fact, a single sensor can detect motion of the fringe pattern. To provide position information, at least two measurement degrees of freedom are required from the detection system. In the phased array detector of FIG. 8, multiple spatially displaced detector elements are used to enable detection of position of the surface even when it is stationary (static position). In another configuration the input signals might be dithered in time and the static position information obtained using a single sensing element. Alternatively, from a known position, a position can be determined by continuously monitoring a passing fringe pattern with a single detector, motion providing the second degree of freedom. The capacity for static position sensing is particularly important where there are significant times of no relative movement such as in a servo control, where a null condition is maintained, or where energy must be conserved by pulsing the sensor on and off.

Figure 6:
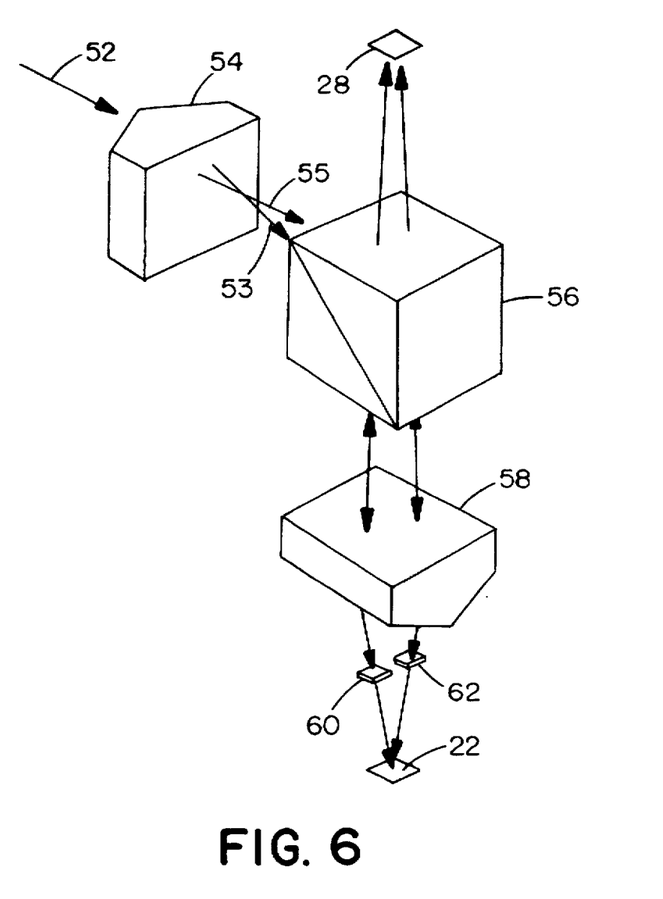
FIG. 6 illustrates another preferred embodiment of the invention.

Another approach, illustrated in FIG. 6, uses circularly polarized light to distinguish one beam from the other. A single slowly converging input beam 52 which is horizontally linearly polarized is split by a prism 54 into two separate beams 53,55 diverging from each other in the horizontal plane. These two are reflected downward by a polarizing beamsplitter 56, redirected by another prism 58, pass through quarter wave retarders 60,62 and form two small overlapped spots of light on the diffuse surface. By orienting the optical axes of the retarders orthogonal to each other, one of the beams is right circularly polarized, and the other left. With this configuration, backscattered light from the surface will propagate back through the retarders, prism, and beamsplitter and form interference fringes on the detector. Due to its polarization after passing back through the retarders, forward scattered and specularly reflected light is directed away from the detector at the polarizing beamsplitter. This design is more stable mechanically, and also offers the optical stability of an equal path interferometer. It will be recognized that many other architectures based on polarization and appropriate use of retarding wave plates will provide the desired selection and interference of backscattered light.

Figure 7:
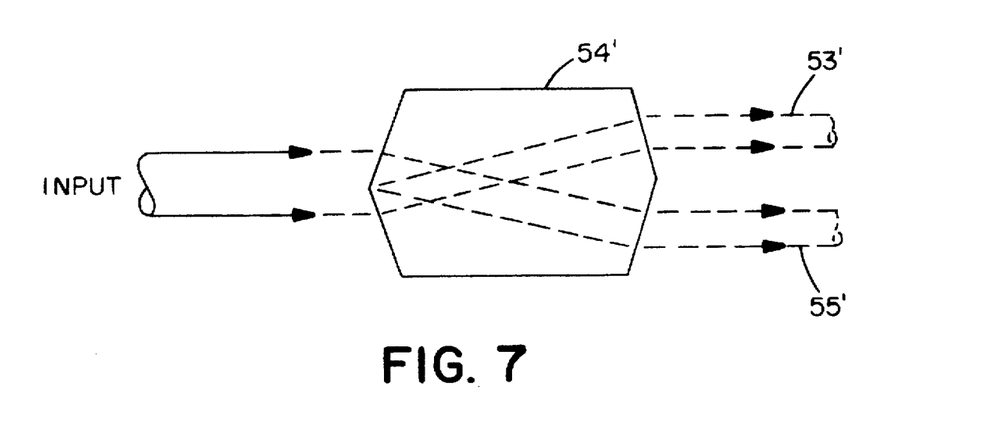
FIG. 7 illustrates an alternative beam splitter for use in the embodiment of FIG. 6.

FIG. 7 illustrates an alternative to the splitting prism 54 of FIG. 6. This prism 54' includes angled faces at both ends to create parallel input beams 53' and 55'. Many other mechanisms for providing separate beams from a common laser source are well known. For example, partially reflecting beam splitters, polarizing beam splitters, and multilevel diffractive optics may be used.

Figure 9:
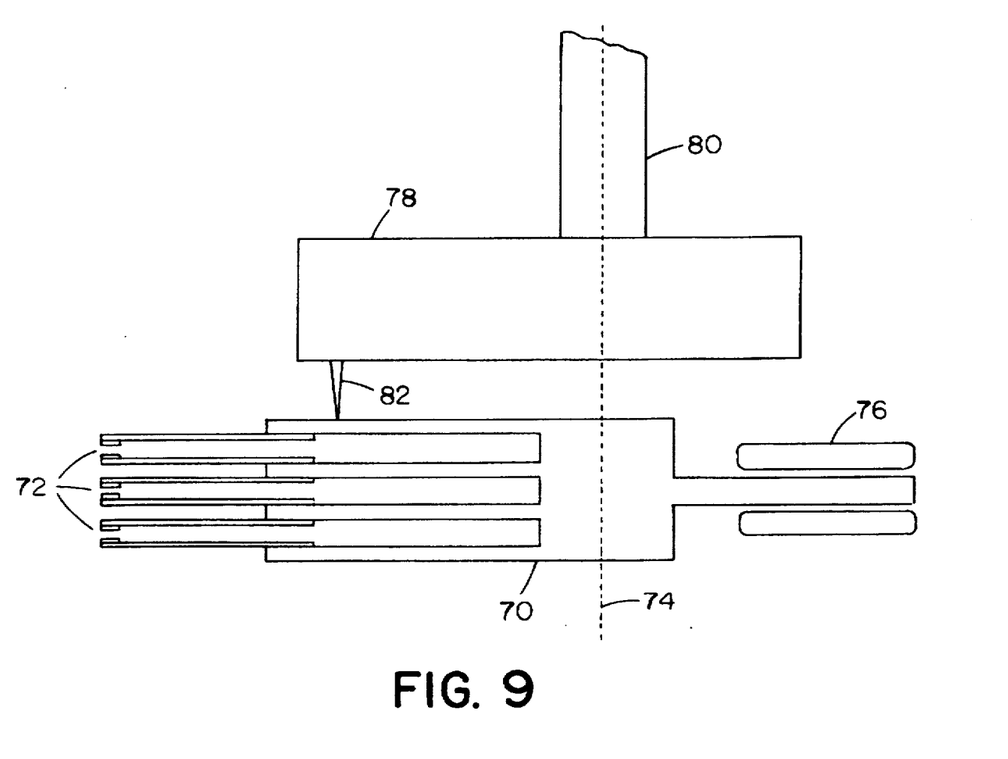
FIG. 9 illustrates a push pin application of the invention.

A particularly useful application of the present invention is in a servo control loop used to write servo tracks on magnetic memory hard disks. In a final stage of the hard disk drive fabrication, servo tracks must be precisely written on the magnetic media. To that end, each hard disk assembly is installed in a servo writing system which controls the location of the read/write arms. Such an application is illustrated in FIG. 9. In the example shown, a read/write arm 70 of the hard disk drive carries three pairs of read/write heads 72. The memory disks (not shown) rotate between those pairs. Displacement of the read/write heads across the rotating magnetic storage disks is obtained by rotating the read/write arm 70 about an axis 74 by means of a voice coil motor 76.

In the past, a servowriting system has included a mechanical push pin which extends through an opening in the hard drive housing and contacts the read/write arm 70. This push pin would extend from an arm 78 which rotates about a shaft 80 coaxial with the read/write arm axis of rotation 74. The angular position of the shaft would be determined by a servo controlled motor which uses an encoder or other interferometer for position feedback.

More recently, the mechanical push pin has been replaced by a non-contact optical system, which eliminates the distortion, resonance, and contamination problems associated with physically contacting the arm. With this system, a small diffraction grating is placed on the read/write arm 70. The servo writer arm 78 contains an interferometric position sensor that emits an optical beam 82 into the hard disk drive and determines the position of the read/write arm 70 by monitoring the light diffracted from the grating. Closed loop servo control of the read/write arm position with respect to the shaft is achieved using this encoder to provide position feedback and the internal voice coil motor 76 to drive the arm. The angular position of the shaft is still controlled by its original positioning system.

In accordance with the present invention, the grating based position sensor is replaced by the diffuse surface sensor of the present invention, and the diffraction grating is eliminated from the read/write arm. Due to the random nature of the sensor's speckle pattern, as illustrated in FIG. 3, the precise location of well defined fringes is initially uncertain. For this reason the servo writing startup procedure involves a search routine to locate an acceptable region of clearly detected fringes. Thereafter, the optical push pin arm 70 is caused to remain over that region for fine servo control of the read/write arm.

An advantage of the present invention is that nothing need be attached to the object to be measured. The object need only have a finish that diffusely scatters light. Acceptable diffuse scattering can generally be obtained by conventional processes such as glass bead blasting, chemical etching, and grinding. The backscattered energy can be enhanced by preparing the surface with a random linear structure oriented perpendicular to the direction of motion. Compared to an isotropic random structure, this makes more efficient use of the incident light by scattering a larger portion back along the incident path. Higher backscattered energy contributes to higher signal to noise ratio, and consequently improved precision in the position measurement made by the sensor. Aluminum rubbed with emery paper, and aluminum foil—which typically contains such structure—are examples of this type of surface.

Figure 10:
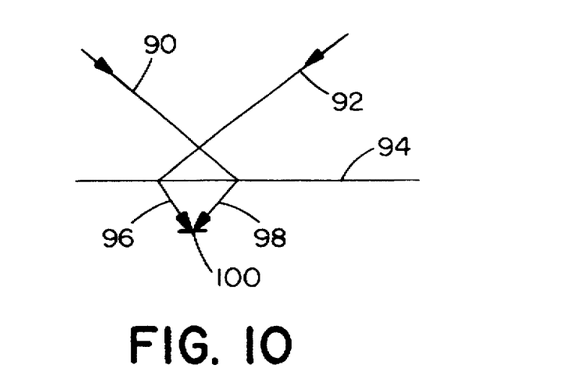
FIG. 10 illustrates an embodiment of the invention using a transmissive surface.

FIG. 10 illustrates a case of measuring position of a transmissive surface. Two input beams 90 and 92 are scattered by a transmissive surface 94. Scattered beams 96 and 98 form a fringe pattern on detector 100. In the transmissive case, the equivalent of backscattered light is light which is scattered at an angle to the normal that is equal to, but in a direction opposite to, the input beam angle of incidence.

While this invention has been particularly shown and described with references to preferred embodiments thereof, it will be understood by those skilled in the art that various changes in form and details may be made therein without departing from the spirit and scope of the invention as defined by the appended claims.

For example, though illustrated to detect motion and position along a single axis x, with additional optics, the motion and position in other directions may also be measured.

Figure 11:
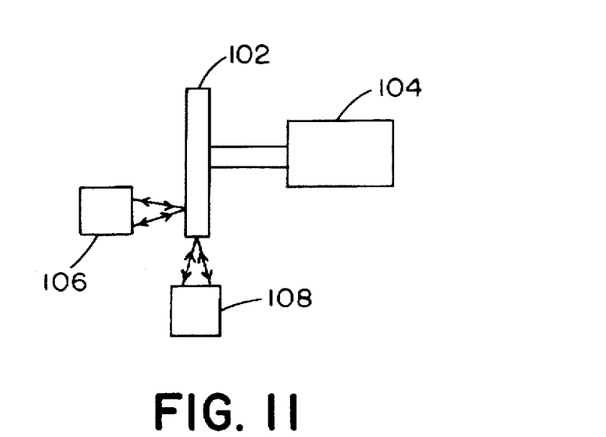
FIG. 11 illustrates use of the invention to track a spindle.

Similarly, although the invention is particularly useful in the push pin application, those skilled in the art will see its application to other non-contacting position sensing applications, such as the measurement of the rotation or angular velocity of motor spindles. For example, FIG. 11 illustrates a spindle 102 mounted to the rotating shaft of a motor 104. The position of that spindle 102 may be detected by a system, as described above, positioned at either 106 or 108.

What is claimed is:

1. A position sensor for sensing position of a diffusely scattering surface comprising:
   a source of coherent illumination which illuminates the diffusely scattering surface with first and second input beams angled toward the surface forwardly and rearwardly, respectively, relative to surface motion;
   a fringe detector; and
   optics to direct light, scattered from the surface in rearward and forward directions, respectively, relative to surface motion, to the detector to form a fringe pattern in the plane of the detector resulting from interference of diffusely scattered light, movement of the surface being detected by the fringe detector through movement of the fringe pattern.

2. A position sensor as claimed in claim 1 wherein the detected scattered light is backscattered.

3. A position sensor as claimed in claim 2 wherein the input beams illuminate and the fringe pattern is derived from a common spot of the diffusely scattering surface.

4. A position sensor as claimed in claim 3 wherein the backscattered light is substantially co-linear with the input beams.

5. A position sensor as claimed in claim 3 wherein the backscattered light from respective input beams is isolated by differential polarization of the input beams.

6. A position sensor as claimed in claim 5 wherein a beam of coherent illumination is split into the separate input beams by a polarizing beam splitter, and backscattered light to the detector is filtered by a polarizing beam splitter.

7. A position sensor as claimed in claim 5 wherein separate input beams of coherent illumination of common polarization are directed toward the surface through a polarizing beam splitter, and light from the separate input beams is separated by polarization wave plates.

8. A position sensor as claimed in claim 5 wherein the fringe detector provides sufficient information to define position of a stationary diffusely scattering surface.

9. A position sensor as claimed in claim 5 wherein the fringe detector is a sensor array.

10. A position sensor as claimed in claim 5 wherein the backscattered light is substantially co-linear with the input beams.

11. A position sensor as claimed in claim 1 wherein the fringe detector is a sensor array.

12. A position sensor as claimed in claim 1 wherein the fringe detector provides sufficient information to define position of a stationary diffusely scattering surface.

13. A position sensor for sensing position of a diffusely scattering surface comprising:
   a source of coherent illumination which illuminates a spot of the diffusely scattering surface with separate polarized input beams from forward and reverse directions, respectively;
   a fringe detector; and
   optics to direct light, backscattered from the surface, to form a fringe pattern in the plane of the detector resulting from interference of diffusely scattered light, backscattered light being isolated from specularly reflected light through polarization filters.

14. A position sensor as claimed in claim 13 wherein the fringe detector is an array of sensor elements.

15. A method of sensing position of a diffusely scattering surface comprising:
   illuminating the surface with coherent illumination in first and second input beams angled toward the surface forwardly and rearwardly, respectively, relative to surface motion;
   directing light diffusely scattered from the surface in rearward and forward directions, respectively, relative to surface movement to a fringe detector; and
   sensing position of a fringe pattern from the diffusely scattered light interfering at the fringe detector as an indication of position of the diffusely reflecting surface.

16. A method as claimed in claim 15 wherein light detected at the fringe detector is backscattered light.

17. A method as claimed in claim 16 wherein the input beams illuminate and the fringe pattern is derived from a common spot of the diffusely scattering surface.

18. A method as claimed in claim 17 wherein the backscattered light is isolated from specularly reflected light by polarization of the input beams.

19. A method as claimed in claim 18 wherein the fringe pattern is detected by a sensor array.

20. A method as claimed in claim 15 wherein the surface is a rotating surface.

* * * * *